(12) United States Patent
Mizukoshi

(10) Patent No.: US 7,978,633 B2
(45) Date of Patent: Jul. 12, 2011

(54) METHOD AND SYSTEM OF UPDATING ROUTING/ESTABLISHING PATHS IN A HIERARCHICAL NETWORK

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 1048 days.

(21) Appl. No.: 10/864,413

(22) Filed: Jun. 10, 2004

(65) Prior Publication Data

US 2004/0252708 A1   Dec. 16, 2004

(30) Foreign Application Priority Data

Jun. 11, 2003   (JP) ................................. 2003-165839

(51) Int. Cl.
*H04L 12/28* (2006.01)
*H04L 12/56* (2006.01)
(52) U.S. Cl. ........................................ 370/256; 370/408
(58) Field of Classification Search .................. 370/328, 370/351, 400, 407; 455/445
See application file for complete search history.

(56) References Cited

U.S. PATENT DOCUMENTS

| | | | | |
|---|---|---|---|---|
| 5,394,436 | A * | 2/1995 | Meier et al. ..................... | 375/132 |
| 6,654,359 | B1 * | 11/2003 | La Porta et al. ................ | 370/328 |
| 6,785,552 | B2 * | 8/2004 | Shinozaki et al. .......... | 455/456.1 |
| 6,947,401 | B2 * | 9/2005 | El-Malki et al. .............. | 370/331 |
| 7,130,614 | B2 * | 10/2006 | Sreemanthula et al. ...... | 455/411 |
| 7,158,791 | B2 * | 1/2007 | Karino et al. .................. | 455/449 |
| 7,161,929 | B1 * | 1/2007 | O'Neill et al. ................. | 370/349 |
| 7,257,104 | B2 * | 8/2007 | Shitama ......................... | 370/338 |
| 7,310,335 | B1 * | 12/2007 | Garcia-Luna-Aceves et al. .............................. | 370/390 |
| 7,333,486 | B2 * | 2/2008 | Novaes .......................... | 370/390 |
| 7,639,686 | B2 * | 12/2009 | Wetterwald et al. .......... | 370/392 |
| 7,657,628 | B1 * | 2/2010 | McDysan et al. ............. | 709/225 |
| 2001/0044305 | A1 * | 11/2001 | Reddy et al. .................. | 455/436 |
| 2002/0025817 | A1 * | 2/2002 | Karino et al. .................. | 455/445 |
| 2002/0105922 | A1 * | 8/2002 | Jabbari et al. ................. | 370/328 |
| 2002/0150056 | A1 * | 10/2002 | Abadi et al. ................... | 370/256 |
| 2003/0169719 | A1 * | 9/2003 | Isobe et al. .................... | 370/338 |
| 2004/0017783 | A1 * | 1/2004 | Szentesi et al. ............... | 370/256 |
| 2004/0081152 | A1 * | 4/2004 | Thubert et al. ................ | 370/392 |
| 2005/0265259 | A1 * | 12/2005 | Thubert et al. ................ | 370/255 |

FOREIGN PATENT DOCUMENTS

| | | |
|---|---|---|
| EP | 1 227 627 | 7/2002 |
| EP | 1 278 341 | 1/2003 |
| JP | 11-112570 | 4/1999 |
| JP | 2002-223219 | 8/2002 |
| JP | 2002-232436 | 8/2002 |
| JP | 2003-046539 | 2/2003 |
| JP | 2004-507162 | 3/2004 |
| WO | 02/15491 | 2/2002 |

* cited by examiner

*Primary Examiner* — Warner Wong
(74) *Attorney, Agent, or Firm* — Young & Thompson

(57) ABSTRACT

A system and method of establishing and routing paths in a network hierarchy is disclosed. A radio base station updates a path from a mobile terminal to a lowest-layer router. The lowest-layer router establishes a path in which a network address to the mobile terminal exists in the radio base station and transfers path information to an intermediate-layer router serving as an upward router. The intermediate-layer router establishes a path in which the network address to the mobile terminal exists in the lowest-layer router and transfers path information to the highest-layer router. The highest-layer router, when having received path information notification from the intermediate-layer router, establishes a path in which the network address to the mobile terminal exists in the intermediate-layer router.

19 Claims, 4 Drawing Sheets

METHOD AND SYSTEM OF UPDATING ROUTING/ESTABLISHING PATHS IN A HIERARCHICAL NETWORK

BACKGROUND OF THE INVENTION

1. Field of the Invention

The present invention relates to a mobile unit managing network and a path establishing method to be used for the mobile unit managing network and more particularly to a method for setting up a hierarchy-type network.

The present application claims priority of Japanese Patent Application No. 2003-165839 filed on Jun. 11, 2003, which is hereby incorporated by reference.

2. Description of the Related Art

In a conventional mobile unit managing network based on host routing, as shown in FIG. 4, a hierarchy-type network is set up using one unit of a highest-layer router R1 as a root router in which each of routers Ra to Rf manages a path for each of mobile terminals MN1 to MN4, as disclosed in, for example, Japanese Patent Application Laid-open No. 2002-223219 (Pages 5 and 6, FIG. 1).

That is, the disclosed conventional mobile unit managing network includes the highest-layer router R1, intermediate-layer routers Ra and Rb, lowest-layer routers Rc to Rf, radio base stations BS1 to BS8, and mobile terminals MN1 to MN4 in which the highest-layer router R1 is connected to the routers Ra to Rf through wire and the radio base stations BS1 to BS8 are connected to mobile terminals MN1 to MN4 by wireless.

Path updating notification fed from each of the mobile terminals MN1 to MN4 is transmitted through each of the radio base stations BS1 to BS8 to each of the lowest-layer routers Rc to Rf from where the path updating notification is further transmitted to the highest-layer router R1. The highest-layer router R1 manages only a network "xxxx::/64" and network addresses "xxxx::1", "yyyy::2", "aaaa::3", and "bbbb::4" are assigned respectively to the mobile terminals MN1 to MN4.

In this case, a communication route is established by the highest-layer router R1 so that the network address "xxxx::1" exists in the intermediate layer router Ra, and "yyyy::2", "aaaa::3", and "bbbb::4" exists in the intermediate router Rb.

A communication route is established by the intermediate-layer router Ra so that the network address "xxxx::1" exists in the lowest-layer router Rd. A communication route is established by the intermediate-layer router Rb so that the network address "yyyy::2" exists in the lowest-layer router Re. A communication route is established by the lowest-layer router Re so that the network address "aaaa::3" and "bbbbb::4" exist in the lowest-layer router Rf.

A communication route is established by the lowest-layer router Rd so that the network address "xxxx::1" exists in the radio base station BS3. A communication route is established by the lowest-layer router Re so that the network address "yyyyy::2" exists in the radio base station BS5. A communication route is established by the lowest-layer router Rf so that the communication address "aaaa::3" exists in the radio base station BS7 and the communication address "bbbb::4" exists in the radio base station BS8.

However, a conventional network set-up method has a problem. That is, in the conventional network set-up method, since only the number of routes for a mobile terminal that can be managed by a highest-layer router can be managed by one mobile unit managing network, a wide communication area can not be covered. To solve this problem, a method is required in which when a mobile terminal moves in a wide communication area, two or more mobile unit managing networks are set up in parallel.

SUMMARY OF THE INVENTION

In view of the above, it is an object of the present invention to provide a mobile unit managing network which is capable of dispersing a load of a highest-layer router and of supporting a communication area being wider than ever by using one highest-layer router and a path establishing method using the mobile unit managing network.

According to a first aspect of the present invention, there is provided a mobile unit managing network including:

a plurality of mobile terminals;
a plurality of mobile radio base stations;
a plurality of mobile lowest-layer routers;
a plurality of mobile intermediate-layer routers;
a plurality of mobile highest-layer routers;
wherein the mobile terminals, the radio base stations, the lowest-layer routers, the intermediate-layer routers, and the highest-layer routers are hierarchically connected to one another; and
wherein each of the intermediate-layer routers according to a network address of each of the mobile terminals routes to an upward router.

In the foregoing, a preferable mode is one wherein each of the lowest-layer routers and each of the intermediate-layer routers perform a path establishing process to disperse a load of each of the highest-layer routers.

Also, a preferable mode is one wherein each of the lowest-layer routers and each of the intermediate-layer routers establishes a path to each of the mobile terminals to notify path information to an upward router.

Also, a preferable mode is one wherein the establishing of a path to each of the mobile terminals, when a radio link between each of the mobile terminals and each of the radio base stations is set up, establishes a path to each of the mobile terminals in response to a path updating notification made by each of the mobile terminals.

Also, a preferable mode is one wherein a default router is arranged as each of the highest-layer routers.

According to a second embodiment of the present invention, there is provided a method for establishing a path in a mobile unit managing network in which mobile terminals, radio base stations, lowest-layer routers, intermediate-layer routers, and highest-layer routers are hierarchically connected, the method comprising:

a step of having each of the intermediate-layer routers switch an upward router according to a network address of each of the mobile terminals.

In the foregoing, a preferable mode is one wherein each of the lowest-layer routers and each of the intermediate-layer routers perform a path establishing process to disperse a load of each of the highest-layer routers.

Also, a preferable mode is one wherein each of the lowest-layer routers and each of the intermediate-layer routers establish a path to each of the mobile terminals and notify path information to the upward router.

Also, a preferable mode is one wherein, when a radio link between each of the mobile terminals and each of the radio base stations is set up, a path to each of the mobile terminals is established in response to a path updating notification made by each of the mobile terminals.

Furthermore, a preferable mode is one wherein a default router is arranged as the highest-layer router.

With the above configuration, a communication area being wider than ever can be supported by one highest-layer router.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
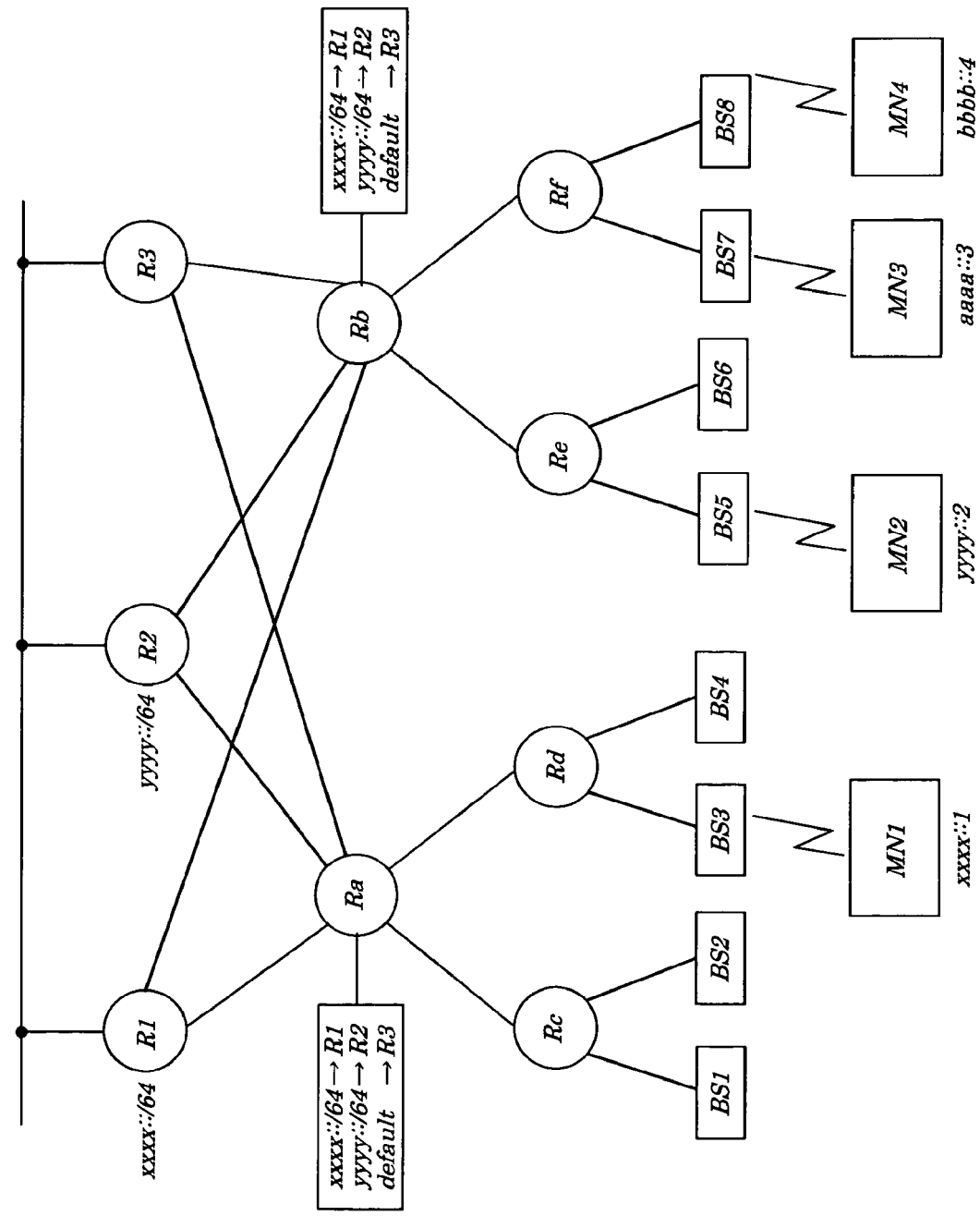
FIG. 1 is a schematic block diagram showing configurations of a mobile unit managing network according to an embodiment of the present invention.

FIG. 1 is a schematic block diagram showing configurations of a mobile unit managing network of an embodiment of the present invention. As shown in FIG. 1, the mobile unit managing network of the embodiment is a hierarchy-type network which includes highest-layer routers R1 to R3, intermediate routers Ra and Rb, lowest-layer routers Rc to Rf, radio base stations BS1 to BS8, and mobile terminals MN1 to MN4. The highest-layer routers R1 to R3, intermediate routers Ra and Rb, and lowest-layer routers Rc to Rf are connected to one another through wire, and the radio base stations BS1 to BS8 are connected to the mobile terminals MN1 to MN4 by wireless.

For example, the highest-layer router R1 is connected to the intermediate routers Ra and Rb through wire. The intermediate routers Ra and Rb are connected to the lowest-layer routers Rc to Rf through wire. The lowest-layer routers Rc and Rf are connected to the radio base stations BS1 to BS8 by wireless. Similarly, the highest-layer routers R2 and R3 are connected respectively to the intermediate-layer routers Ra and Rb. The intermediate-layer routers Ra and Rb are connected to the lowest-layer routers Rc to Rf, that is, the intermediate-layer router Ra is connected to the lowest-layer routers Rc and Rd, and the intermediate-layer router Rb is connected to the lowest-layer routers Re and Rf. The lowest-layer routers Rc to Rf are connected to the radio base stations BS1 to BS8, that is, the lowest-layer router Rc is connected to the radio base stations BS1 and BS2, the lowest-layer router Rd is connected to the radio base stations BS3 and BS4, the lowest-layer router Re is connected to the radio base stations BS5 and BS6, and the lowest-layer router Rf is connected to the radio base stations BS7 and BS8.

The highest-layer routers R1 to R3, intermediate routers Ra and Rb, and lowest-layer routers Rc to Rf each manage the downward paths, one by one, for the mobile terminals MN1 to MN4. In the example, the highest-layer router R1 manages only a network "xxxx::/64". The highest-layer router R2 manages only a network "yyyy::/64". The highest-layer router R3 manages networks that are not managed by the highest-layer routers R1 and R2.

The network addresses "xxxx::1", "yyyy::2", "aaaa::3", and "bbbb::4" are assigned respectively to the mobile terminals MN1 to MN4. High-order alphabets in the network addresses are called a "network prefix" (standardized by IETF (Internet Engineering Task Force)) and are used for identifying a specified network. In the example, the highest-layer router R1 manages the mobile terminal MN1. The highest-layer router R2 manages the mobile terminal MN2. The highest-layer router R3 manages the mobile terminals MN3 and MN4.

Upward paths are established, in advance, at the intermediate-layer routers Ra and Rb and determine a destination out of the highest-layer routers R1 to R3 depending on a network address of each of the mobile terminals MN1 to MN4. That is, each of the high-order routers (each of the highest-layer routers R1 to R3) is routed to by each of the intermediate-layer routers Ra and Rb according to a network address of each of the mobile terminals MN1 to MN4.

For example, a packet (not shown) fed from the mobile terminal MN1 having a network address of "xxxx::1" is transferred by the intermediate-layer routers Ra and Rb to the highest-layer router Rl. A packet (not shown) fed from the mobile terminal MN3 having a network address of "aaaa::3" is transferred by the intermediate-layer routers Ra and Rb to the highest-layer router R3 set as a default router.

Figure 2:
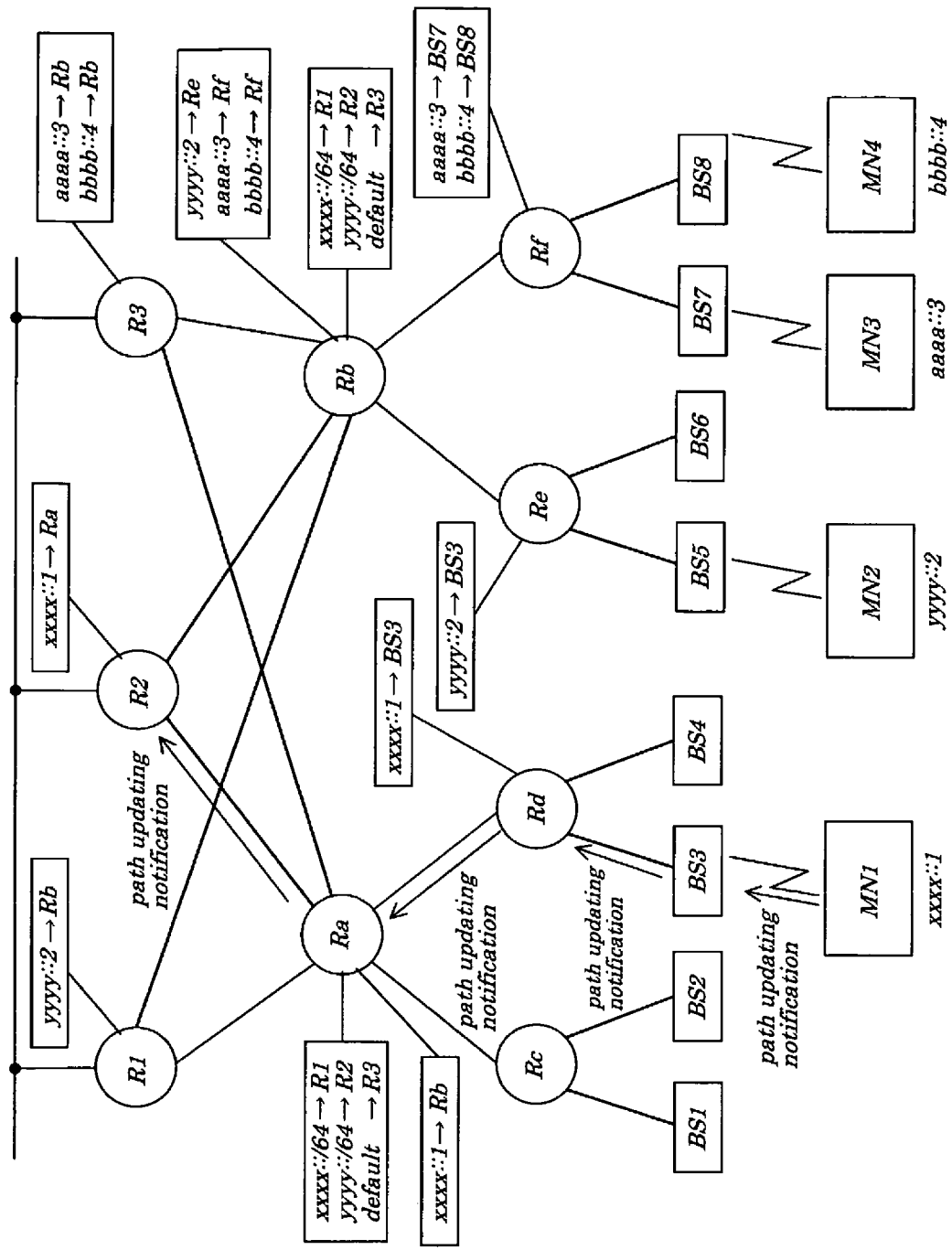
FIG. 2 is a diagram showing a path established in the mobile unit managing network according to the embodiment of the present invention.
Figure 3:
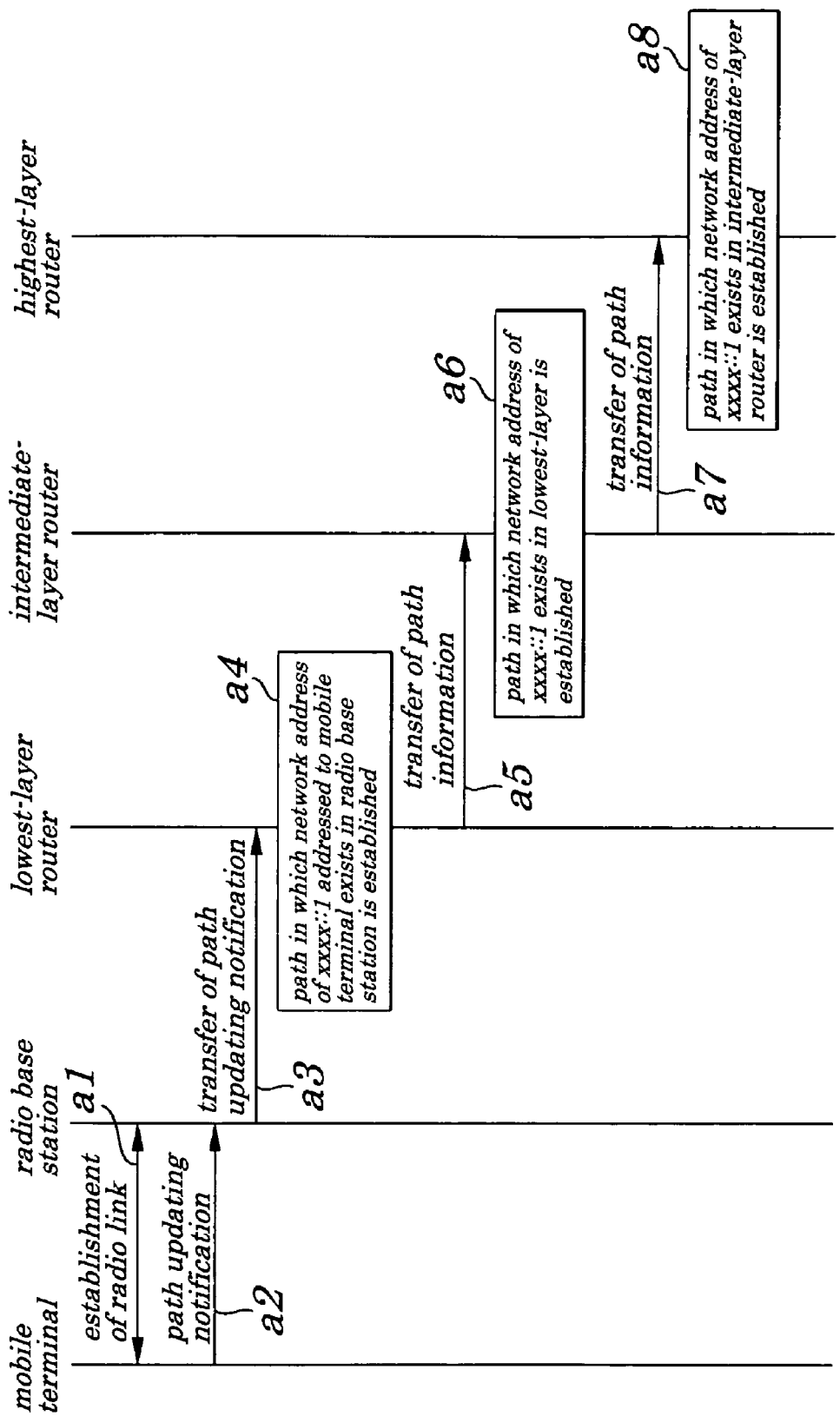
FIG. 3 is a sequence chart showing a path establishing operation of the mobile unit managing network according to the embodiment of the present invention.
Figure 4:
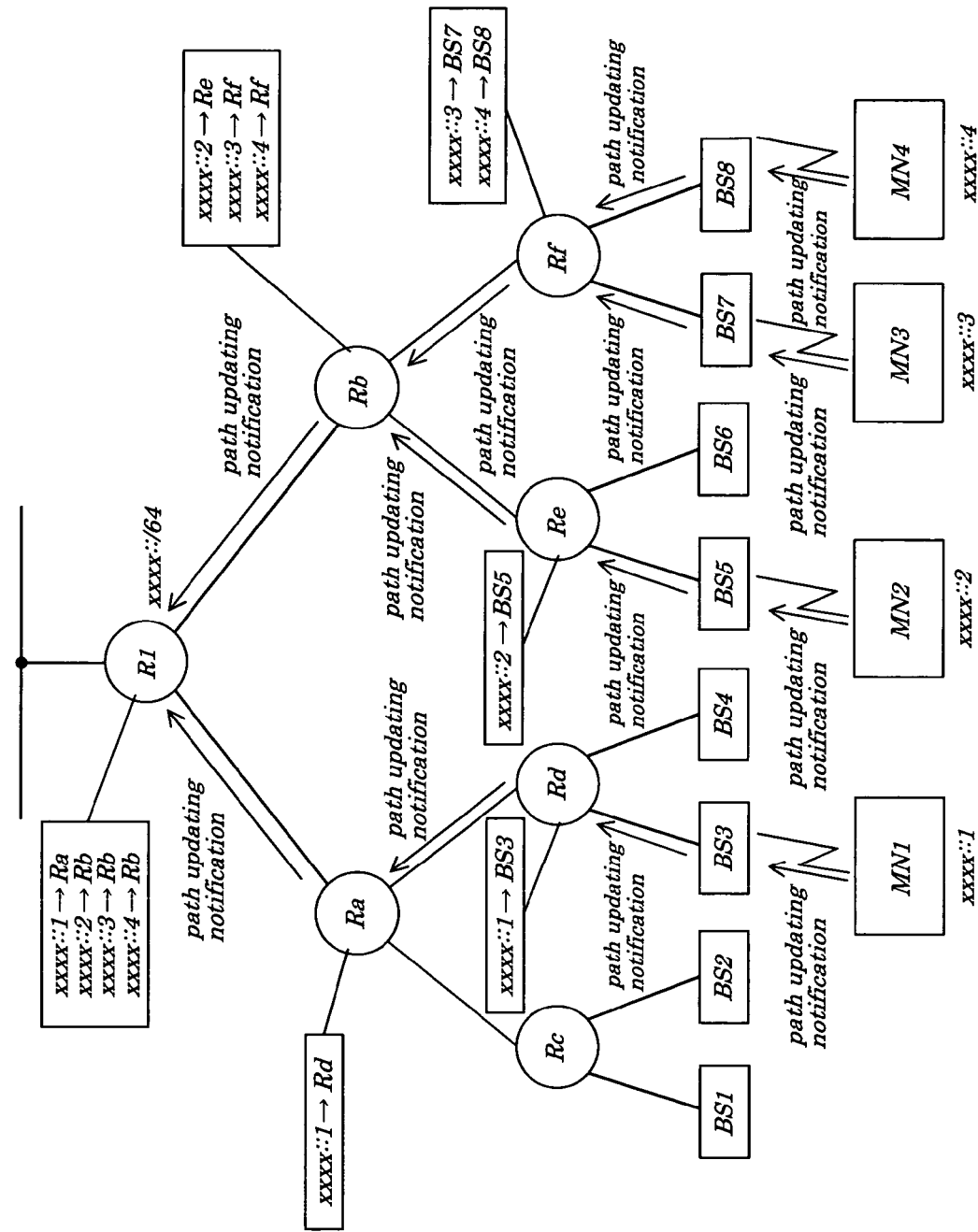
FIG. 4 is a diagram showing paths established in a conventional mobile unit managing network.

FIG. 2 is a diagram showing paths established in the mobile unit managing network of the embodiment of the present invention. FIG. 3 is a sequence chart showing a path establishing operation of the mobile unit managing network of the embodiment of the present invention. The path establishing operation of the mobile unit managing network of the embodiment of the present invention is described.

The mobile terminal MN1, after having set up a radio link with the radio base station BS3 (Step a1 in FIG. 3), transmits a path updating notification of a network to the radio base station BS3 (Step a2 in FIG. 3). The radio base station BS3 transfers the path updating notification fed from the mobile terminal MN1 to the lowest-layer router Rd (Step a3 in FIG. 3).

The lowest-layer router Rd, after having established a path in which a network address of "xxxx::1" addressed to the mobile terminal MN1 exists in the radio base station BS3 (Step a4 in FIG. 3), transfers the path information notification to the intermediate-layer router Ra serving as an upward router (Step a5 in FIG. 3).

The intermediate-layer router Ra establishes a path in which the network address "xxxx::1" addressed to the mobile terminal MN1 exists in the lowest-layer router Rd (Step a6 in FIG. 3). In the example, since a network to which the network address of "xxxx::1" belongs is "xxxx::/64", the intermediate-layer router Ra transfers the above path information notification to the highest-layer router R1 (Step a7 in FIG. 3).

The highest-layer router R1, when having received the path information notification from the intermediate-layer router Ra, establishes a path in which the network address of "xxxx::1" addressed to the mobile terminal MN1 exists in the intermediate-layer router Ra (Step a8 in FIG. 3).

When a radio link between the mobile terminals MN2 to MN4 and the radio base stations BS5, BS7, and BS8 is set up, by using the same procedure as described above, as shown in FIG. 2, paths to the highest-layer routers R2 and R3 are established.

Thus, in the hierarchy-type mobile unit managing network, when the radio link between the mobile terminals MN1 to MN4 and the radio base stations BS3, BS5, BS7, and BS8 is set up, by having each of the lowest-layer routers Rc to Rf and each of the intermediate-layer routers Ra and Rb establish paths to each of the mobile terminals MN1 to MN4 and by notifying the path information to the upward router, a load of each of the highest-layer routers R1 to R3 can be dispersed and a communication area being wider than ever can be supported by one highest-layer router. As a result, in the embodiment, even if each of the mobile terminals MN1 to MN4 moves to a wider communication area, continuous communications are made possible.

According to the embodiment of the present invention, since a mobile terminal not scheduled to be managed by the mobile unit managing network can be managed, a mobile terminal that has moved from abroad can be also managed in the same configurations of the network in the same manner as above.

It is apparent that the present invention is not limited to the above embodiments but may be changed and modified without departing from the scope and spirit of the invention. For example, in the above embodiment, each of the lowest-layer routers Rc to Rf, each of the intermediate-layer routers Ra and Rb, and each of the highest-layer routers R1 to R3 manage two pieces of lower-end mobile terminals, however, the number of routers in each hierarchical layer or the number of hierarchical layers may be increased. Moreover, according to the present invention, the number of routers that can be connected by each of the routers R1 to R3 and Ra to Rf and the number of radio base stations may be increased and the communication method for the radio link between the mobile terminal and the radio base station is not limited.

What is claimed is:

1. A system of updating routing paths in a hierarchical network comprising:
   a plurality of mobile terminals;
   a plurality of radio base stations;
   a plurality of intermediate-layer routers;
   a plurality of highest-layer routers;
   wherein said mobile terminals, said radio base stations, said intermediate-layer routers, and said highest-layer routers are hierarchically connected to one another; and
   wherein each of said intermediate-layer routers selects one of said plurality of highest-layer routers as an upward router, according to a network address of each of the mobile terminals, and routes to the selected upward router,
   wherein each of said intermediate-layer routers is connected to each of said highest-layer routers, without said intermediate layer routers being connected to each other.

2. The system of updating routing paths in a hierarchical network according to claim 1, further comprising a plurality of lowest-layer routers, each of which is connected between a plurality of said radio base stations and the corresponding intermediate-layer router, wherein each of said lowest-layer routers and each of said intermediate-layer routers perform a path establishing process to disperse a load of each of said highest-layer routers.

3. The system of updating routing paths in a hierarchical network according to claim 2, wherein each of said lowest-layer routers and each of said intermediate-layer routers establishes a path to each of said mobile terminals and notifies path information to the upward router.

4. The system of updating routing paths in a hierarchical network according to claim 3, wherein said establishing the path to each of said mobile terminals, when a radio link between each of said mobile terminals and each of said radio base stations is set up, establishes a path to each of said mobile terminals in response to a path updating notification made by each of said mobile terminals.

5. The system of updating routing paths in a hierarchical network according to claim 1, wherein at least one default router is defined among said plurality of highest-layer routers.

6. A method for establishing a path in a network in which a plurality of mobile terminals, a plurality of radio base stations, a plurality of intermediate-layer routers, and a plurality of highest-layer routers are hierarchically connected to one another, said method comprising:
   a step of having each of said intermediate-layer routers select one of said plurality of highest-layer routers as an upward router, according to a network address of each of said mobile terminals, and route to the selected upward router,
   wherein each of said intermediate-layer routers is connected to each of said highest-layer routers, without said intermediate-layer routers being connected to each other.

7. The method for establishing a path according to claim 6, wherein each of a plurality of lowest-layer routers is connected between a plurality of said radio base stations and the corresponding intermediate-layer router, wherein each of said lowest-layer routers and each of said intermediate-layer routers perform a path establishing process to disperse a load of each of said highest-layer routers.

8. The method for establishing a path according to claim 7, wherein each of said lowest-layer routers and each of said intermediate-layer routers establish a path to each of said mobile terminals and notify path information to said upward router.

9. The method for establishing a path according to claim 8, wherein, when a radio link between each of said mobile terminals and each of said radio base stations is set up, a path to each of said mobile terminals is established in response to a path updating notification made by each of said mobile terminals.

10. The method for establishing a path according to claim 6, wherein at least one default router is arranged among said plurality of highest-layer routers.

11. A system of updating routing paths in a hierarchical network comprising:
   a plurality of mobile terminals;
   a plurality of radio base stations;
   a plurality of intermediate-layer routers;
   a plurality of highest-layer routers;
   wherein said mobile terminals, said radio base stations, said intermediate-layer routers, and said highest-layer routers are hierarchically connected to one another; and
   wherein each of said intermediate-layer routers comprises a means to select one of said plurality of highest-layer routers as an upward router, according to a network address of each of said mobile terminals, and route to the selected upward router,
   wherein each of said intermediate-layer routers is connected to each of said highest-layer routers, without said intermediate-layer routers being connected to each other.

12. The system of updating routing paths in a hierarchical network according to claim 11, further comprising a plurality of lowest-layer routers, each of which is connected between a plurality of said radio base stations and the corresponding intermediate-layer router, wherein each of said lowest-layer routers and each of said intermediate-layer routers perform a path establishing process to disperse a load of each of said highest-layer routers.

13. The system of updating routing paths in a hierarchical network according to claim 12, wherein each of said lowest-layer routers and each of said intermediate-layer routers comprise a means to establish a path to each of said mobile terminals and to notify path information to the upward router.

14. The system of updating routing paths in a hierarchical network according to claim 13, wherein said means to establish the path to each of said mobile terminals, when a radio link between each of said mobile terminals and each of said radio base stations is set up, establishes a path to each of said mobile terminals in response to a path updating notification made by each of said mobile terminals.

15. The system of updating routing paths in a hierarchical network according to claim 11, wherein at least one default router is defined among said plurality of highest-layer routers.

16. The system of updating routing paths in a hierarchical network according to claim 1, wherein each of said intermediate-layer routers routes to an upward router based on correspondence between address of the mobile terminal and the network prefix assigned to a highest layer router of the plurality of highest-layer routers.

17. The method for establishing a path according to claim 6, wherein each of said intermediate-layer routers routes to an upward router based on correspondence between address of the mobile terminal and the network prefix assigned to a highest layer router of the plurality of highest-layer routers.

18. The system of updating routing paths in a hierarchical network according to claim 1, wherein each highest-layer router of the plurality of highest-layer routers manages a logical network, the network address of each mobile terminal of the plurality of mobile terminals corresponding to the logical network.

19. The method for establishing a path according to claim 6, wherein each highest-layer router of the highest-layer routers manages a logical network, the network address of each mobile terminal corresponding to the logical network.

* * * * *